United States Patent [19]
Van Dort

[11] Patent Number: 6,148,003
[45] Date of Patent: Nov. 14, 2000

[54] INFORMATION DISTRIBUTION SYSTEM

[75] Inventor: Erik J. Van Dort, Eindhoven, Netherlands

[73] Assignee: U.S. Philips Corporation, New York, N.Y.

[21] Appl. No.: 08/929,536

[22] Filed: Sep. 15, 1997

[30] Foreign Application Priority Data

Sep. 18, 1996 [EP] European Pat. Off. .............. 96202606

[51] Int. Cl.[7] ....................................................... H04J 3/02
[52] U.S. Cl. ........................... 370/462; 370/445; 370/461
[58] Field of Search .................................... 370/462, 437, 370/438, 439, 445, 447, 451, 402, 460, 461, 465, 404, 230, 231, 235, 236, 252, 253, 337, 341, 347, 352, 418, 432, 450, 449, 444, 452, 463

[56] References Cited

U.S. PATENT DOCUMENTS

| | | | |
|---|---|---|---|
| 5,418,967 | 5/1995 | Simcoe et al. ........................... | 710/241 |
| 5,691,973 | 11/1997 | Ramstrom et al. ...................... | 710/131 |
| 5,764,895 | 6/1998 | Chung ...................................... | 370/402 |
| 5,778,175 | 7/1998 | Paul et al. ................................. | 709/250 |
| 5,796,633 | 8/1998 | Burgess et al. .......................... | 702/187 |
| 5,909,544 | 6/1999 | Anderson, Ii et al. .................. | 709/208 |

FOREIGN PATENT DOCUMENTS

3412418 10/1985 Germany .

*Primary Examiner*—Dang Ton
*Assistant Examiner*—Phirin Sam
*Attorney, Agent, or Firm*—Tony E. Piotrowski

[57] ABSTRACT

The invention relates to an information distribution system with a plurality of stations (100, 102, 104) and at least one shared resource (120, 122), such as an audio channel. Access to a shared resource is managed in a distributed manner. Each station comprises a controller 154. If a station requires a shared resource, the controller 154 of the station checks resource status information stored in a local memory 156 to determine whether the shared resource is available. If the resource is available, the controller 154 selects the available shared resource and uses communication means 150 to send a status message informing other ones of the stations that the station uses the selected resource. Next, the controller 154 uses access means 152, such as an audio selector, to access the selected resource. Upon receiving the status message, controllers 154 of the other stations update the resource status information stored in the local memory 156 according to a received status message.

24 Claims, 5 Drawing Sheets

INFORMATION DISTRIBUTION SYSTEM

BACKGROUND OF THE INVENTION

The invention relates to a method for, in an information distribution system comprising a plurality of stations and at least one shared resource, gaining access to the shared resource; each of the stations comprising resource status information and communication means for exchanging a status message comprising status information relating to the shared resource. The invention further relates to an information distribution system comprising a plurality of stations and at least one shared resource; each station comprising: a memory for storing resource status information; communication means for transmitting a status message comprising status information relating to the shared resource; access means for gaining access to a shared resource; and a controller for causing the access means to access a selected shared resource.

Such an information distribution may for instance be used as an audio communication network, such as a public address system or a conference system. DE 3412418 describes such a conference system which is used for simultaneous translations. A number of stations are connected via input and output audio channels and a data channel (in/out) to a central station. A station comprises an amplifier and loudspeaker for reproducing an audio signal which is received via one of the input audio channels. The stations further comprise a microphone and amplifier for generating an audio signal to be distributed via one of the output audio channels. A station may be used by up to two translators. With a manual switch in the station a translator can select one of the audio input channels. The stations comprise a controller for reading out the setting of the manual switch (selected audio channel) and setting an audio channel selector accordingly. A central station comprises communication means for bidirectional communication with the stations. The central station regularly polls the controllers of the stations in order to read out the channel selection of the stations. The central station displays all selected channels to a supervisor. The stations further have two pre-set buttons for selecting one of two pre-set output channels. The central station can send pre-set information to the stations. A special audio channel is reserved for verbal communication between the supervisor at the central computer and a translator at one of the stations. Among others, a supervisor may instruct a translator to switch to another input channel.

The audio channels in the known system are shared resources. Usually, one station acts as a source station for a specific audio channel. One or more (or even all) stations act as destination stations for the audio channel. A station may act simultaneously as a source or a destination station. As an example, the station may receive as a destination station a signal via an audio input channel and as a source station distribute a signal with a simultaneous translation via an audio output channel. The translation may be used by translators at one or more other stations to make translations in a further language. The shared resources are accessed by the local station under control of a human user. A supervisor at the central station ensures that possible conflicts (e.g. two or more source stations generating a conflicting signal at the same audio channel) are resolved by verbal communications with the users at the involved stations.

SUMMARY OF THE INVENTION

It is an object of the invention to provide a method and system of the kind set forth, which provides simple and reliable access to a shared resource.

To achieve this object, the method according to the invention is characterised in that the method comprises the steps of each station monitoring the exchanged resource status information; and a station, referred to as the initiating station, wishing to access a shared resource: checking the resource status information within the initiating station to determine whether the shared resource is available, and if the checking indicates that the shared resource is available: selecting the available shared resource, sending the status message informing other ones of the stations that the initiating station uses the selected resource, and accessing the selected resource.

Management of the shared resource(s) is performed automatically in a distributed manner. This avoids the need for human control. Also a central station is no longer required, reducing the costs and eliminating a single-point of failure. When a station accesses a resource it informs the other stations. Each station, which wishes to use a shared resource, maintains the status of the resource. If the status information indicates that the resource is available, a station may access the resource.

An embodiment of the method according to the invention is characterised in that the method comprises the step of a station, which uses a shared resource, recurrently sending the status message informing other ones of the stations that it uses the shared resource. By recurrently sending the status information, the distributed status in the stations of the system can be maintained. In this manner no specific initialisation routines are required for informing newly added or powered-on stations of the status of the resources. Especially if the status information is transmitted frequently (e.g. every five seconds provides a good balance between on the one hand overhead in the station and the communication and on the other hand the accuracy of the stored status information) a newly added or powered-on station simply acquires the distributed status by monitoring the transmissions of the status messages. Also errors in transmitting a status message do not need to be recovered by using special communication protocols, since an up-to-date status message is transmitted any how.

An embodiment of the method according to the invention is characterised in that sending the status message comprises broadcasting the status message. By broadcasting the status message to all stations using only one broadcast frame, the load on the communication channel is kept low. Moreover, the transmitting station only needs to transmit one frame to inform all interested stations and the transmitting station does not need to provide and maintain addressing information of stations interested in the status message.

An embodiment of the method according to the invention is characterised in that the status message comprises priority information indicative of the usage of the shared resource by the station sending the status message and in that the resource status information comprises the priority information. By using priority information, the stations can better resolve conflicts caused by a same resource being desired by more than one station. Priority may be assigned in many different ways. As an example, priority may be assigned to reflect the importance of a station. As an example, if the information distribution system is used as a conference system highest priority may be assigned to the station of the chairman, with intermediate priority assigned to stations at a committee table and lowest priority is assigned to stations in the remainder of the conference hall. In such a situation priority may be assigned to a station in a fixed manner and apply to all resources used by the station. Priority may also be assigned to reflect the importance of a specific usage of a resource. For instance, if the information distribution system is used for simultaneous translations, for the main speaker at that moment resources may be used at the highest priority. Translations for major languages may use resources at an intermediate priority; whereas translations for minor languages are distributed at the lowest priority. In this way, priority may be determined separately for applications, such as main speaker, major translation, minor translation, and may vary over time as the use of a station changes.

An embodiment of the method according to the invention, wherein the system comprises a plurality of shared resources, is characterised in that the checking step comprises indicating that a shared resource is available if the shared resource is free or if the shared resource is used at a priority submissive to the intended new usage and no other shared resource is free. In the system, first all free resources are used. If no free resources are available any more, a station selects a resource which is used at a submissive priority by another station. In this way no conflicts (stations claiming the same resource) occur as long as free resources are available.

An embodiment of the method according to the invention is characterised in that the method comprises the step of a station, which uses a shared resource, releasing the shared resource in response to receiving a status message if the usage of the shared resource by the station is of a submissive priority compared to the priority indicated in the received status message. In this way the mechanism of exchanging status messages is also used to take over a resource already used by another station at a submissive priority. No separate mechanism is required.

An embodiment of the method according to the invention is characterised in that the method comprises the step of the initiating station releasing the shared resource in response to receiving a status message if the status message is received within a predetermined period after the initiating station for the first time sending a status message for the shared resource and if the usage of the shared resource by the initiating station is of an equal priority compared to the priority indicated in the received status message. This provides for a simple mechanism for dealing with the situation wherein the initiating station accesses a resource based on out-of-date status information. The initiating station accepts, for a predetermined period, that another station may already be using the resource at the same or even higher priority. If the other station transmits a status messages at regular intervals, then the predetermined period preferably covers at least the duration of the interval. Alternatively, the other station, already using the resource, may respond much quicker to a status message sent by the initiating station. In which case, the predetermined period may be much shorter.

An embodiment of the method according to the invention is characterised in that the method comprises the step of a station informing other ones of the stations that it no longer uses a shared resource when the station releases the shared resource. This allows the other stations to quickly update the stored status information after a resource becoming free.

An embodiment of the method according to the invention is characterised in that the method further comprises the step of a station administrating a shared resource as being free if the station does not receive a status message indicating that the shared resource is in use within a predetermined period following receipt of the last status message indicating that the shared resource was in use. In this way the status information can be updated to overcome situations wherein a station is not reporting the release of a resource. The mechanism may be used to overcome error situations wherein a station normally reports the release of a station but may not be able to do so in all circumstances, such as failure in the communication or a power-down of the station. A station may also be designed never to report the release of a resource. This simplifies the station, at the expense of other stations not immediately noticing that the resource has become free.

An embodiment of the method according to the invention is characterised in that wherein the system comprises a plurality of shared resources, characterised in that the step of checking the resource status information comprises checking the resource status information relating to individual ones of the shared resources until a predetermined number of available shared resource has been located or until the status information for all shared resources has been checked; and in that the step of selecting the available shared resource comprises randomly selecting a shared resource from the located available shared resources, if the checking results in locating a plurality of available shared resources. This reduces the chance of stations independently selecting the same resource for access, whereas actually a number of resources where available.

An embodiment of the method according to the invention is characterised in that the method comprises the steps of: the initiating station sending a request to at least one other station requesting the other station to indicate whether a specific shared resource is still in use if the checking indicates that the specific shared resource is not free, and a station in response to receiving said request indicating to the initiating station whether the specific shared resource is still in use according to the resource status information of the receiving station. In this way the chance of a station deciding on out-of-date status information (or no status information at all if the station is just been added to the system or powered-on) is reduced. Preferably, a station stores which station uses a shared resource and sends the request to the station which is administrated as using the resource.

An embodiment of the method according to the invention is characterised in that the method comprises the steps of the initiating station claiming the selected resource by informing other ones of the stations of the intended access to the selected resource, waiting a claiming period, allowing other ones of the stations to return resource status information regarding the selected resource, and only accessing the selected resource, if within the claiming period no status message is returned which conflicts with the claim of the initiating station; and the step of a station informing the initiating station that the station uses a shared resource, in response to the initiating station claiming the shared resource. This reduces the chances of a station accessing an already used resource even further.

An embodiment of the method according to the invention is characterised in that the method comprises determining the claiming period randomly within a predetermined time window. This reduces the chance of multiple stations, which want to access the same resource, getting into a repetition where two or more stations claim the same resource almost simultaneously, receive the claim of the other station(s) and, in response, release the resource.

BRIEF DESCRIPTION OF THE DRAWING

These and other aspects of the invention will be apparent from and elucidated with reference to the embodiments shown in the drawings.

DESCRIPTION OF THE PREFERRED EMBODIMENTS

Figure 1:
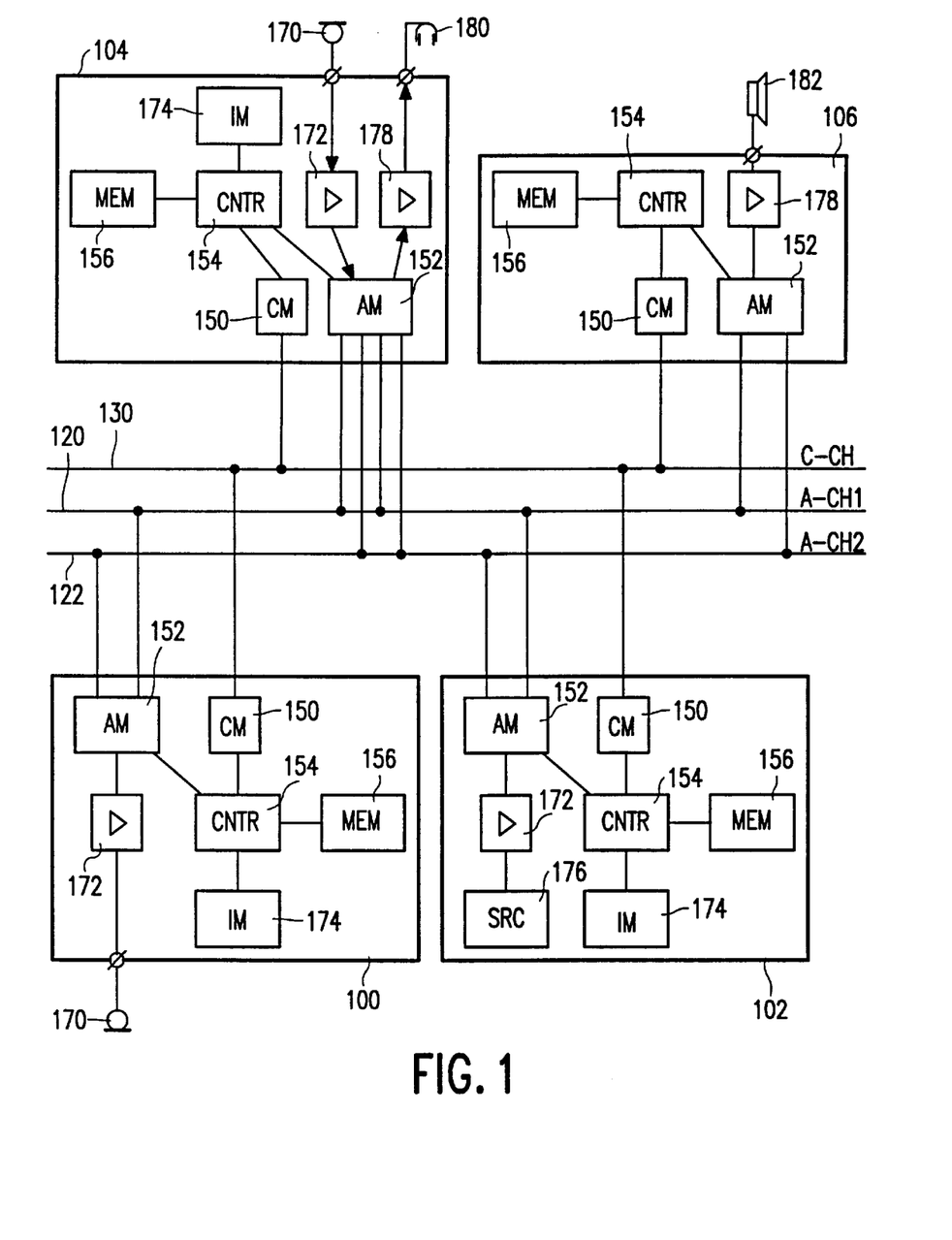
FIG. 1 shows a block diagram of a system according to the invention.

FIG. 1 shows an example of an information distribution system according to the invention. The system of FIG. 1 is an audio communication system which may, for instance, be used as a public address system for distribution of audio and announcements in, for instance, a factory, a shop or an airport or as a conference system. The system may also be used in a domestic environment to distribute audio signals from audio sources, such as a tuner or CD player, to audio destinations, such as a recorder or speakers, which may be located in one or more rooms. The system comprises a number of stations 100, 102, 104, which are able to independently gain access to a shared resource according to the method of the invention. In the example, two audio channels 120 and 122 form the shared resources. The station 100, 102 and 104 can take the initiative to claim one or both of the shared resources 120 or 122. In the example, this coincides with the stations 100, 102 and 104 being audio sources. The system further comprises a station 106 which is not able to independently gain access to a shared resource. In the example, this coincides with the station 106 being an audio destination. Each station comprises access means 152 for acquiring access to a shared resource. The access means 152 may be of conventional construction. For instance, if in the example system the audio channels are provided using separate audio wiring for each channel, the access means 152 may be formed by a conventional controllable audio input or output selector. The stations 100, 102, 104 and 106 further comprise communication means 150 for bidirectional data communication. In the example of FIG. 1, the communication takes place via a communication channel 130. It will be appreciated that each of the audio channels 120 and 122 and the communication channel 130 may be formed using separate wiring, such as twisted pairs. In such a case, the most cost-effective solution for the audio distribution and the communication may be selected. Alternatively, the channels may be modulated at different frequencies using only one cable, such as a coaxial cable. Particularly for digital audio signals, the channels may also be combined using digital techniques, such as time division multiplexing. In such a case, advantageously, an isochronous communication scheme is used allowing for distribution of the audio signals at high quality. It will be appreciated that instead of using wires also wireless communication techniques may be used.

Each station further comprises a controller 154. The controller 154 controls various aspects of a station. Among other aspects, the control 154 instructs the access means 152 to access or release a specific one of the shared resources 120 and 122. The controller 154 communicates with the controllers in the other station via the communication means 150.

In FIG. 1, station 100 is a so-called call station, which may be provided with a microphone 170 allowing a user to speak. The station 100 may also comprise an output amplifier 172 for amplifying the microphone signal before distributing the signal via one of the audio channels 120 or 122. Typically, such a call station 100 also comprises user input means 174, such as a button, allowing a user to indicate to the station that the user wishes to speak. This acts as a trigger to the controller 154 to try and acquire a shared resource. Station 102 is another source station, comprising one or more internal or external audio sources 176. The audio source 176 may be formed by any suitable means, such as an audio tuner, an audio tape player, a compact disc player or a computer memory storing, for example, digitised lyrics, chimes or messages. Station 102 may also comprise an output amplifier 172 for amplifying the audio signal before distributing the signal. Station 104 functions as a source station as well as a destination station. Like station 100, station 104 may be provided with a microphone 170, an output amplifier 172 and user input means 174. The access means 152 can access a selected output audio channel as well as a selected input audio channel. This is illustrated by the access means 152 being doubly connected to the audio channels 120 and 122. Station 104 comprises an input amplifier 178 for amplifying the selected audio input signal. The amplified signal may be supplied to loudspeakers or headphones 180. Station 104 is suited to be used for simultaneous translations or in systems, such as used for multilingual conferences or meetings, where each attendant is provided with headphones for hearing the speaker in a preferred language. Station 104 is also suited for a conventional inter-com system. Station 104 may also be used in an information distribution system used as an entrance and inter-com system for an apartment building, where a station is located near the entrance to the building and in each apartment. The fourth type of station in the system, station 106, is a destination station only. Like station 104, station 106 comprises an input amplifier 178 for providing an amplified signal to loudspeakers 182 or headphones. Station 106 is suited for a conventional conference system where the signal from the main speaker is distributed via one channel to one or more destination station for supply to those present via loudspeakers. In such a system, other audio channels may be used for other purposes, such as a private discussion with the chairman.

It will be appreciated that the system of FIG. 1 may also be used to distribute video or a combination of audio and video. To this end, a station may be provided with conventional video input means, such as a camera or VCR, and video output means, such as a display or VCR. Also other forms of information, may be distributed, such as distributing teletext-style information to teletext monitors in an airport.

Figure 2:
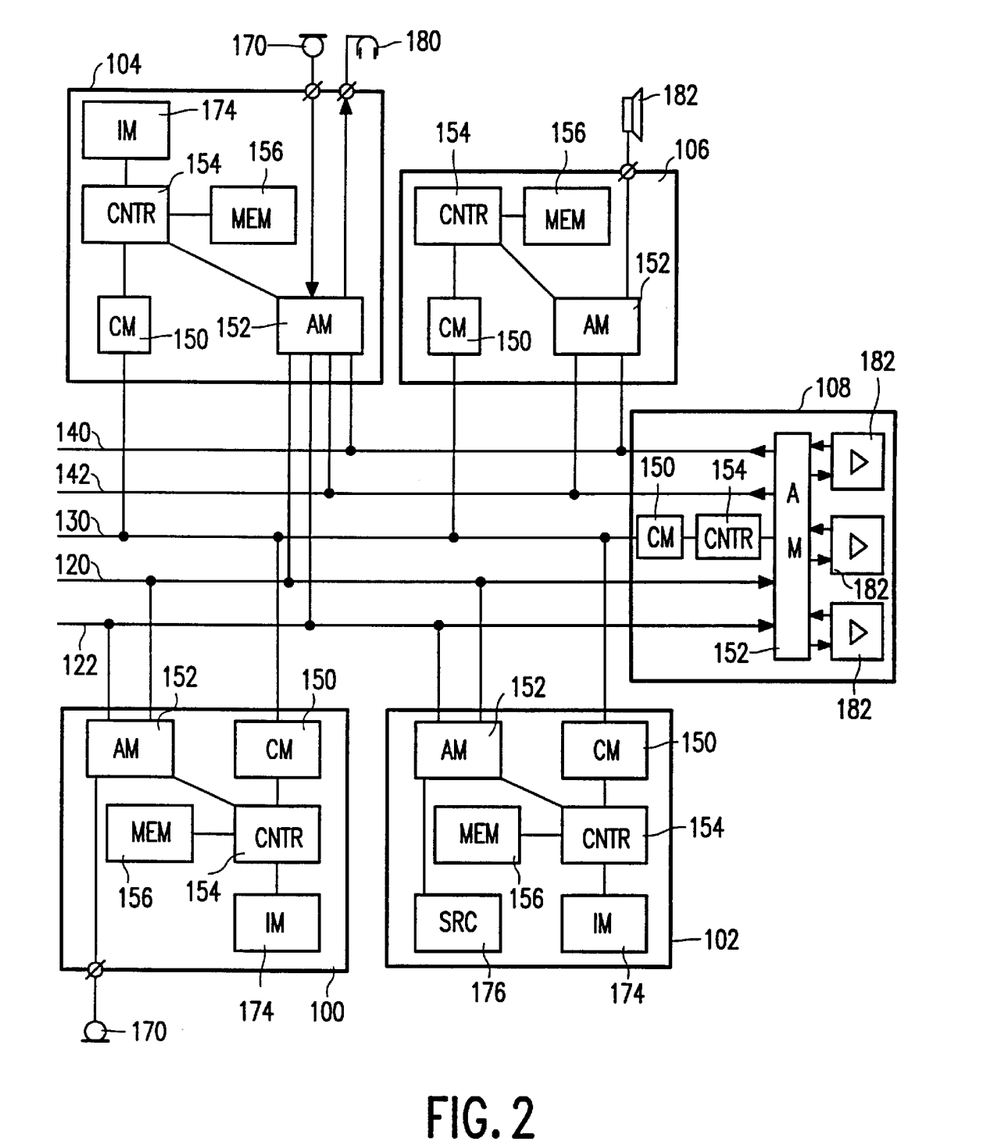
FIG. 2 shows a block diagram of an alternative system.

FIG. 2 shows an alternative arrangement of an information distribution system according to the invention. Here each audio signal is only amplified once, instead of multiple times in the system of FIG. 1 (once in the source station and in all destination station which have selected that audio signal as input). FIG. 2 shows an amplification station 108, with at least one amplification unit 182 for each audio input channel. Preferably, the amplification station 108 comprises more amplification units 182 than there are input channels in the system. Under control of a controller 154, access means 152 selects an audio input channel to be amplified and an audio output channel for supplying the amplified signal to. There may be a fixed relationship between the input channel and output channel. For instance, the output channel 140 may always be used in combination with the input channel 120 and the output channel 142 for the input channel 122. In this case, the access means 152 acts as a parallel operating input and output selector. The combination of one input channel with the respective output channel is seen as one shared resource. The input channels and output channels may also be individually selectable, in which case the input and output channels can be seen as separate shared resources. A station requiring an audio channel may additionally reserve an amplification unit for the channel. In this way, the amplification units 182 can be regarded as shared resources. A station can access an amplification unit by the controller 154 of the station using the communication means 150 to instruct the controller 154 of the amplification station 108 to control the access means 152 of the amplification station 154 to connect a selected amplification unit 182 to a selected audio input/output channel. As an alternative to using a central amplification station, also a number of amplification stations may be used, each having at least one amplification unit 182. If such an amplification station comprises only one amplification unit, the amplification station itself can be regarded as a shared resource.

As illustrated in FIG. 1 and 2, each station according to the invention also comprises a memory 156 for storing resource status information. Any suitable form of memory may be used, such as RAM, battery backed-up RAM or EEPROM.

Figure 3:
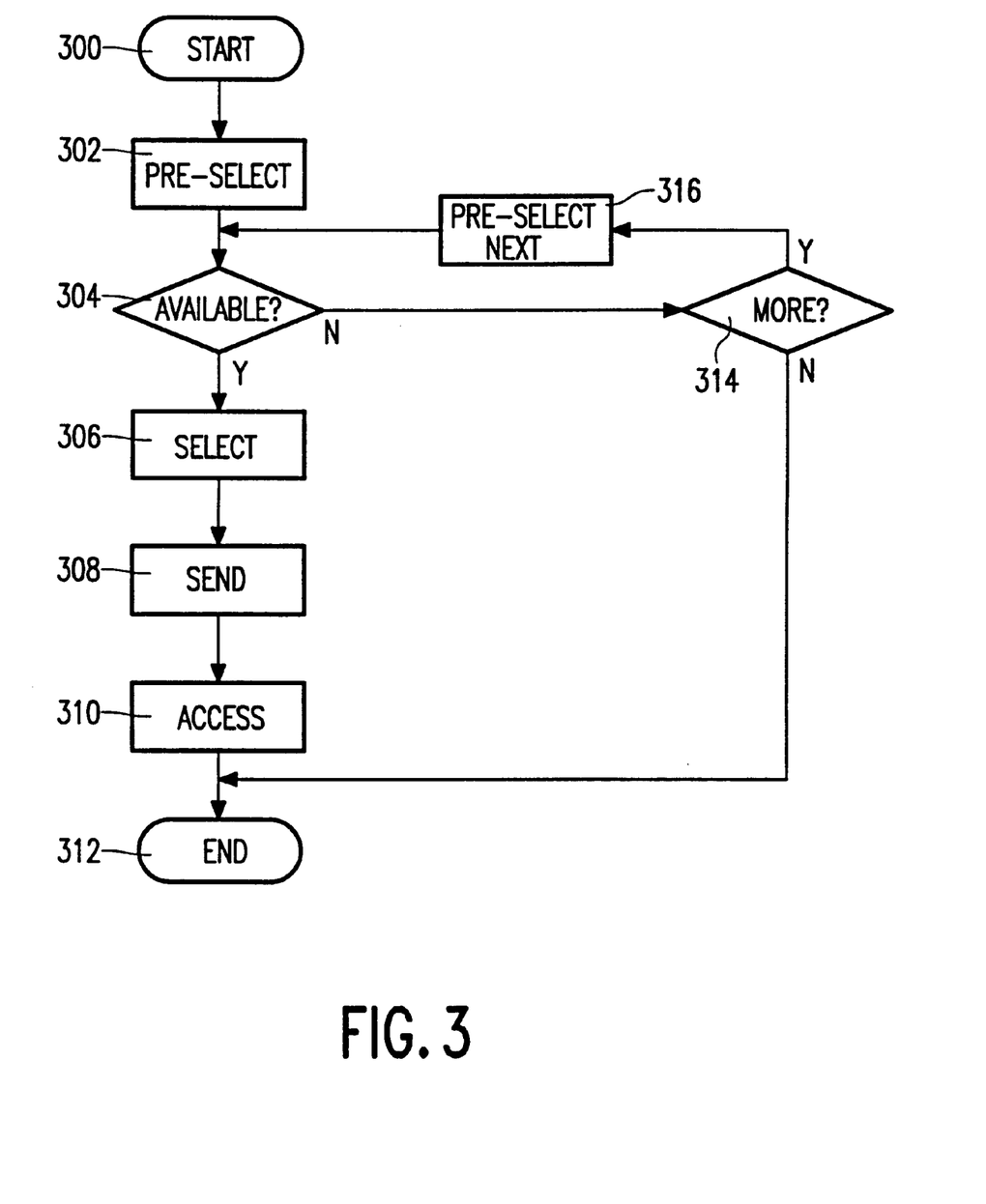
FIG. 3 shows a flow-diagram for distributed access according to the invention.

FIG. 3 shows a flow-chart of the activities performed by a controller 154 in order to acquire a shared resource. The start trigger 300 may be provided in many ways, such as the user of a call station in which the controller 154 is located activating user interface means 174, for instance by pressing a microphone button at the station. The trigger 300 may also be generated internally in the station, for instance as part of a program executed by the controller 154. The trigger may also originate from another station and be supplied to the station via the communication means 150. In response to the trigger 300, the controller 154 pre-selects at step 302 a shared resource and checks at step 304 the resource status information stored in the memory 156 of the station to determine whether the shared resource is available or not. If the shared resource is available, the controller 154 selects at step 306 the available shared resource and uses the communication means 150 to send at step 308 a status message informing other ones of the stations that the station uses or intends to use the selected resource. Next, the controller 154 uses the access means 152 to access the selected resource at step 310. It will be appreciated that the order of the step 308 of sending the message and the step 310 of accessing the resource may be reversed. If the checking at step 304 reveals that the pre-selected resource is not available, at step 314 the controller 154 tests if it has checked all of the resources for which status information is stored in the memory 156. If so, the procedure ends and no resource has been found to be available at that moment. If not, at step 316 the controller 154 pre-selects a next resource to be tested at step 304.

Typically, the memory 156 comprises a number of entries, each for storing resource status information relating to one shared resource. In general, the resource status information comprises status information and resource identification. In a basic form the status information may be stored using only one bit, indicating whether or not an associated resource is free. Obviously, the status information may be more complex, as will be described in more detail below. The resource identification may be any suitable identification of the resource. For instance, if the resource is an audio channel, then the identification may simply be a number corresponding to the channel. In such a case, it may not even be needed to explicitly store the identification. For instance, the memory 154 can be arranged as a table, wherein a table entry corresponds to a channel in a fixed manner. In a more dynamic situation, for instance where optional stations in the system can act as resources for other stations in the system, the identification may consist of a communication identification, such as an address, of the resource.

The status message may be transmitted by the controller 154 of a station via the communication means 150 using conventional communication techniques, such as used for Local Area Networks. The message is received by the communication means 150 of all stations active at that moment and interested in receiving the status information. The sending controller 154 may send a separate status message to each of the stations in the system. In such a case, preferably the sending controller 154 does not send the message to stations not interested in the message. This can be achieved in different ways. As an example, stations interested in a certain type of resource are allocated communication identifications in a defined range. For instance, audio source stations within a system which allows a maximum of 64 audio source stations are assigned addresses consecutively in a pre-defined range of 64 consecutive addresses. In this way, the controller 154 only needs to administrate how many source stations are present in the system to be able to send a status message to each of them. Advantageously, broadcasting techniques are used to transmit the status message in one operation to more than one other station. As an example, the status message may be transmitted using a conventional broadcast message, wherein each station in the system can receive the same broadcast message. Advantageously, a special form of broadcasting, referred to as multi-casting, is used wherein one status message is received by a selected group of stations. For instance the stations may be arranged in groups, where each group corresponds to a type of resource. As an example, all audio source stations may be a member of the group of stations interested in audio channels. A station interested in more than one type of resource may be part of all corresponding groups. By using multicasting, stations not interested in certain status messages also do not receive the message.

The controllers 154 of the receiving stations update the resource status information stored in the local memory 156 according to the received status message. Typically, the status message comprises the same information as stored in the memory 156 for the resource. It will be appreciated that optimisations are possible. For instance, in a situation wherein a station does not need to store the identification of individual resources (e.g. the station is able to make a fixed translation between an entry in a table in them memory and the identification of the corresponding resource), it may still be beneficial to include the resource identification in the status message, allowing more flexibility at system level.

In a further embodiment according to the invention, the controller 154 of a station recurrently sends a status message as long as the station uses a shared resource. The message informs the other stations that the station uses the shared resource. Preferably, the status message is transmitted at regular intervals. Advantageously, the interval is chosen sufficiently short to ensure that newly added or powered-on stations receive a status message for each used resource, in which the stations are interested, within a reasonable period and sufficiently long to ensure that the load on the stations and the communication system is kept reasonably low. As an example, in a conventional information distribution system an interval of five seconds may give acceptable delays without causing too much overhead.

In a further embodiment according to the invention, the status information comprises priority information indicative of the usage (or intended usage) of the shared resource by a station. The priority information is exchanged using the status messages, allowing all interested stations to store the priority information in the memory 156. Various forms of priority have already been described above. In a simple system, only one bit needs to be reserved (in the memory 156 and in the status message) to distinguish between a high priority and a low priority usage. Obviously, more advanced schemes may be used as well.

In a further embodiment according to the invention, the controller 154 uses the priority information for determining whether a resource is available or not. In this embodiment, a resource is deemed to be available if the resource is free or if the resource is not free but used at a lower priority then the intended use by the station of a controller (assuming that the highest priority indicates the most important usage and the lowest priority indicates the least important usage). In general a resource is considered to be free if the resource is not used by another station. It will be appreciated that certain types of resources may support simultaneous use by a maximum number of stations. Such a resource may be considered to be free if at least one more station can still use the resource (the maximum number of using stations has not yet been reached). Obviously, the controller 154 may perform the availability checking in many ways. For example, the controller 154 may first check the entries in the memory 156 to see if at least one resource is free and, if not, check the entries again for at least one resource at a lower priority. If no resource is free, the controller 154 could stop with checking for a resource with a lower priority at the first located resource meeting this criterion. Alternatively, the controller may search until it has located the resource with the lowest priority. Obviously, the two search operations may also be combined in one.

In a further embodiment according to the invention, the controller 154 instructs the access means 152 to cease accessing a shared resource if the controller 154 receives via the communication means 150 a status message which indicates that the shared resource is used (or going to be used) by another station at a higher priority. In this way the mechanism of exchanging status messages is also used to take over a resource already used by another station at a lower priority. This also overcomes the situation in which the station had decided to access a shared resource, which according to its local status information was available, but actually was already used by another station. Such a situation may, for instance, occur when a station has recently been powered-on and has not yet received a status message for the resource or when, due to communication errors, the station did not (yet) receive a status message indicating that the resource was in use. In such a situation, the station which already used the resource at a higher priority transmits a status message, upon which the 'new' station releases the resource.

In a further embodiment according to the invention, the controller 154 instructs the access means 152 to cease accessing a shared resource if the controller 154 receives via the communication means 150 a status message which indicates that the shared resource is used (or going to be used) by another station at a higher or equal priority. If the usage is of equal priority, the controller 154 only ceases the access if the status message is received within a predetermined period after the station of the controller 154 for the first time transmitting a status message for the shared resource. In this way the 'new' station accepts that its status information may be incorrect and that another station may already be using the resource, in which case the new station withdraws its claim for the resource. Preferably, the predetermined period covers at least the duration of one interval in between transmitting status messages. If so, the station which already uses the resource does not need to take any additional steps to inform this to the new station. Alternatively, the station which already uses the resource responds earlier to the status message of the new station by sending an additional status message. In this way the predetermined period may be much shorter, with a minimum of twice the time required to generate and transmit a message and to respond to the message.

In a further embodiment according to the invention, the controller 154 uses the communication means 150 to transmit a message indicating it no longer uses a resource at the moment the station of the controller 154 stops the access to the resource. This allows the other stations to quickly update the stored status information after a resource becomes free. Furthermore, it allows stations to decrease the interval of retransmitting the status message from, for instance five seconds, to thirty seconds. This reduces the overhead in the network and the stations, while the status information is kept up to date.

In an embodiment according to the invention, the controller 154 of a station updates the resource status information in the memory local to the station of the controller 154 to indicate that a resource is free if the controller 154 has not received for a predetermined period a status message indicating that the resource is still in use. The controller 154 may do so by (re-)starting a timer for the resource each time it receives a status message for a resource. Preferably the timer is initialised at a time sufficiently longer than the interval for re-transmitting a status message. To overcome loss of a status message (e.g. due to a temporary communication failure) and avoiding that stations conclude that this implies that the resource has become free, the timer is preferably initialised to a considerably longer period of, e.g. 3 to 10 times the re-transmission interval. When the timer expires the controller 154 updates the memory 156 to indicate that the resource has become free. In this way the status information can be updated to overcome situations wherein a station is not able to report the release of a resource, for instance, as a result of a power-down of the station. Alternatively, a station may be designed to never report the release of a resource. This simplifies the station, at the expense of other stations not immediately noticing that the resource has become free.

Figure 4:
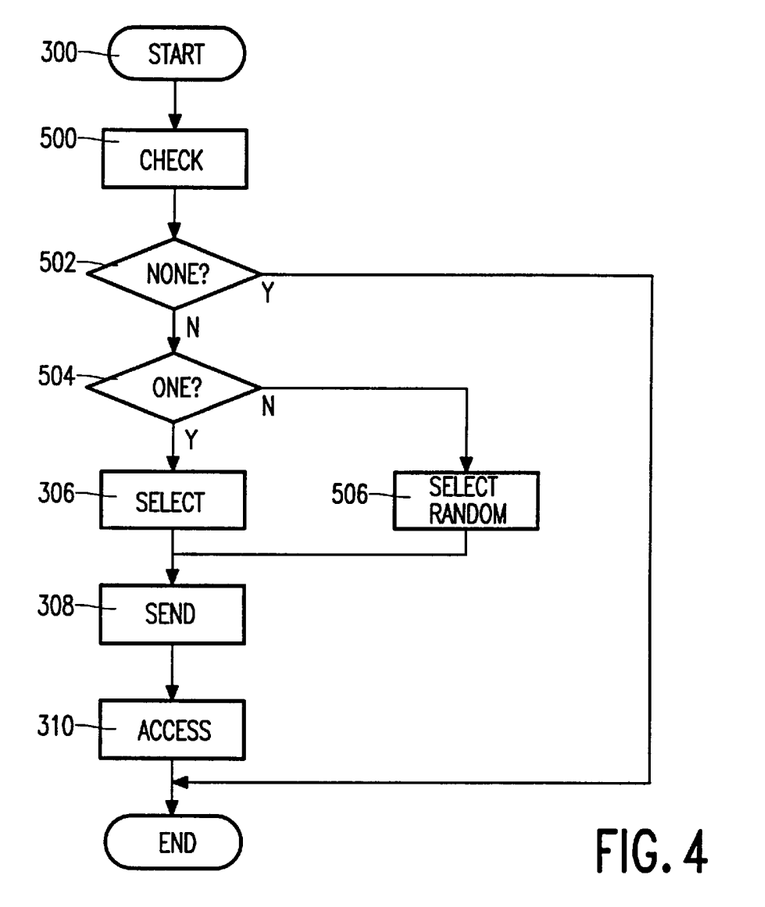
FIG. 4 shows a second flow-diagram according to the invention.

FIG. 4 illustrates a further flow diagram of an embodiment according to the invention, wherein at step 500 the controller 154 checks which resources are available, according to the status information stored in the memory 156. If at step 502 it is determined that no resources are available, the process stops. If at step 504 it is determined that more than one shared resource is available, then at step 506, the controller randomly selects one of the available resources before sending a status message at step 308 and accessing the selected resource at step 310. This reduces the chance of stations independently selecting the same resource, such as the first available resource, for access, whereas actually a number of resources were available and the stations could have selected different resources. If at step 504 it is determined that only one shared resource is available, this resource is selected at step 306. Obviously, it is sufficient to stop the checking of step 500 as soon as at least two available resources have been found. However, the more available resources are found, the higher the chance of different stations selecting different resources to be selected, reducing the chance of a collision in trying to access the same resource. It will be appreciated that the checking at step 500 and the random selection at step 506 may be performed in many different ways. One way is to check all entries of the memory 156 and count the number M of available resources. Next, a (pseudo-)random number N is generated within the range 1 to M and the entries are checked again until the N-th available resource is located. The (pseudo-)random number may be generated in any suitable manner. For instance, the controller 152 may use a cyclic counter, which is increased (e.g. by one or a larger prime number, such as 13) each time a random number is required by the station and the controller 152 performs a modulo M operation on the counter to obtain N−1.

In an embodiment according to the invention the controller 154 checks whether the status information stored in the local memory 156 is up-to-date by sending a message to one of the other stations requesting this station to provide status information. The station receiving such a request supplies the required information in response. It will be appreciated that this scheme may be implemented in various ways. As an example, if the controller wants to verify if a resource is still being used, the controller 154 may send a request message to the station which according to the status information in the memory 156 of the station of the controller is using the resource. The request message could comprise an identification of the resource. A response message could take the form of a simple yes/no message. As an alternative, the controller 154 may request that another station downloads the entire status information from the memory 156 of the other station to the memory 154 local to the controller 154. In this way the chance of a station deciding on out-of-date status information (or no status information at all if the station is just been added to the system or powered-on) is reduced. This scheme can be used as an alternative or to complement the scheme of transmitting status messages at regular intervals.

Figure 5:
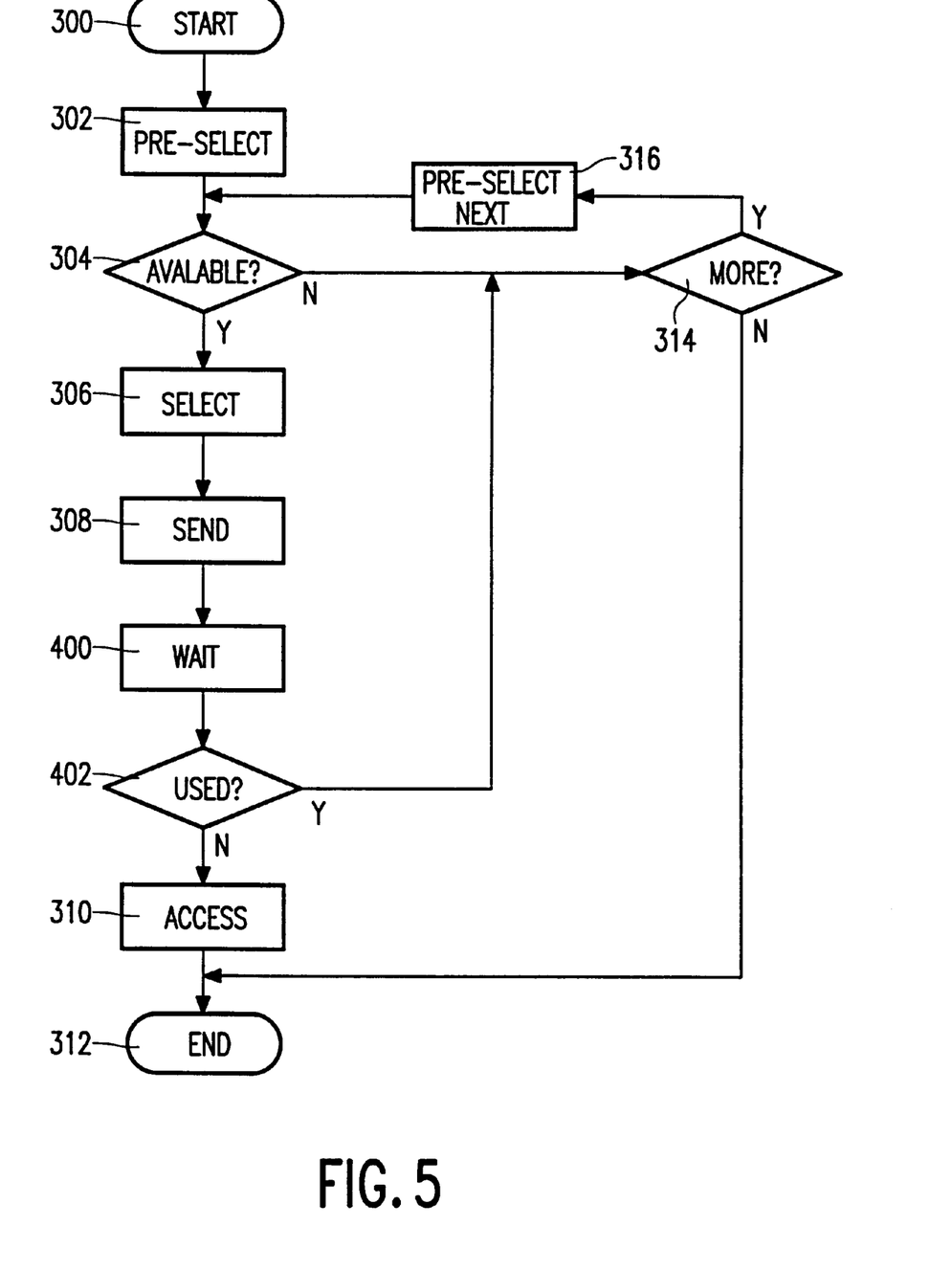
FIG. 5 shows a third flow-diagram according to the invention.

In a further embodiment according to the invention, as illustrated in FIG. 5, the controller 154 at step 400 waits a claiming period after sending the status message at step 308 and before actually accessing the resource at step 310. If, at step 402, the controller 154 determines that during this claiming period a message has been received indicating that the resource is already in use, then the controller 154 tries to select another resource. If, on the other hand, no such message has been received, the controller 154 assumes that the resource is free and ensures that the resource is accessed, at step 310. It will be appreciated that as soon as the controller 154 receives such a message, the controller 154 may terminate the waiting at step 400. The message may be a status message as described above. If so, two aspects, namely a notice that the station wishes to access a resource and a notice of the actual access, are combined in one message. A station which receives a status message for the first time for a specific resource knows that it still has a defined period to object by sending a message indicating it already uses the resource. The objection message may be a special message or, preferably, the status message as described above. If the period extends over a longer time frame than the interval between re- transmitting the status message by a station which uses the resource, then this station does not need to send any objection message. It may still do so, enabling the claiming station to quicker select another resource. Instead of sending a status message at step 308, alternatively, a special claim message may be sent, indicating to the other stations that the station intends to access the resource but that the resource has not yet been accessed. In such a situation, the controller 154 preferably still sends a status message once the controller has decided to access the resource. Using the mechanism described for this embodiment, problems of a resource being accessed by more stations than allowed, due to a station accessing the resource based on wrong status information, can be avoided.

In a further embodiment according to the invention, the controller 154 determines the claiming period randomly within a predetermined time window. In this way, different stations, which initially may been operating (almost) simultaneously (e.g. after a power-on of the entire system) loose synchronisation. This reduces the chance of multiple stations, which want to access the same resource, stay in a same repetition where two or more station almost simultaneously claim the same resource, receive the claim of one of the other claiming stations and, in response, release the resource.

Figure 6A:
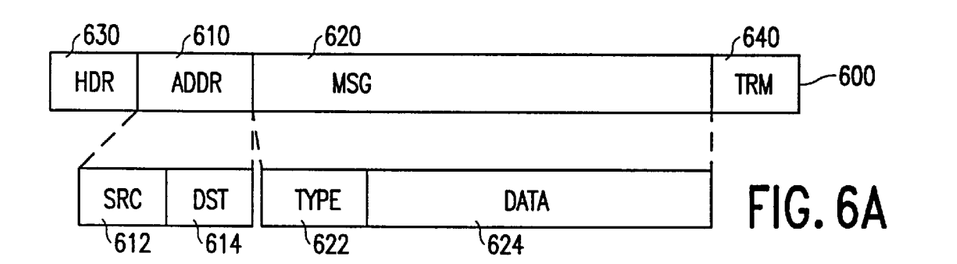
FIG. 6A and 6B illustrate a frame and message structure for use in a system according to the invention.
Figure 6B:
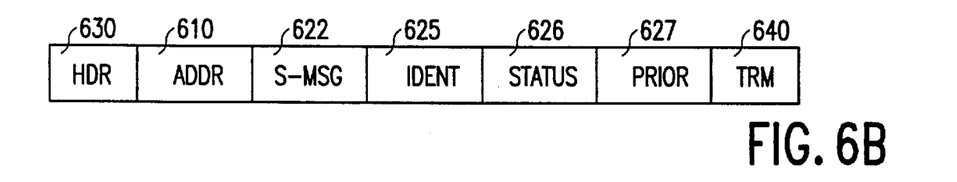

FIG. 6A and B illustrate a possible frame and message structure for messages used in the system. Frame 600 comprises an addressing field 610 with a source address field 612, identifying the sending station, and destination address field 614, identifying the receiving station. For a conventional broadcast message or a multi-cast message, the destination field may be loaded with a broadcast address (resulting in all stations interested in broadcast messages receiving the message) or a specific multicast address (resulting in only the stations having expressed their interest in message with the specific multicast address receiving the message). The frame 600 further comprises a message field 620. The message field 620 further comprises a message type field 622 and a message data field 624. The message type field 622 is used to identify different types of messages, such as a status message or a claim message. The message data field 624 carries the actual message content. The frame 600 may also comprise additional fields, such as a header field 630, for instance to allow for arbitration or time synchronisation, and a termination field 640, for instance containing a checksum. FIG. 6B, shows a possible structure of a status message, where field 625 identifies the shared resource, field 626 provides the status (used/free) of the shared resource and field 627 indicates the priority of the usage or intended usage.

What is claimed is:

1. A method for, in an information distribution system comprising a plurality of stations and at least one shared resource, gaining access to the shared resource; each of the stations including resource status information and communication means for exchanging a status message status information relating to the shared resource, the method comprising the steps of:

each of the plurality of stations monitoring the exchanged resource status information; and     an initiating station, wishing to access a shared resource:

checking the resource status information within the initiating station to determine whether the shared resource is available, and         if the checking indicates that the shared resource is available:

selecting the available shared resource, and             sending the status message informing the other stations that the initiating station is using or intends to use the selected resource.

2. The method as claimed in claim 1, further comprising the step of the initiating station recurrently sending the status message informing the other stations that it is using the shared resource.

3. The method as claimed in claim 1, wherein the step of sending the status message comprises broadcasting the status message.

4. The method as claimed in claim 1, wherein the status message comprises priority information indicative of the usage of the shared resource by the station sending the status message and the resource status information comprises the priority information.

5. The method as claimed in claim 4, wherein the information distribution system comprises a plurality of shared resources, and wherein the checking step comprises indicating that one of the plurality of shared resources is available if the one shared resource is free or if the one shared resource is used at a priority submissive to an intended new usage and no other of the plurality of shared resources is free.

6. The method as claimed in claim 4, further comprising the step of the initiating station releasing the shared resource in response to receiving a new status message if the usage of the shared resource by the initiating station is of the submissive priority compared to the priority indicated in the received new status message.

7. The method as claimed in claim 6, further comprising the step of the initiating station releasing the shared resource in response to receiving the new status message if the new status message is received within a predetermined period after the initiating station first sends the status message for the shared resource and if the usage of the shared resource by the initiating station is of an equal priority compared to the priority indicated in the received new status message.

8. The method as claimed in claim 1, further comprising the step of the initiating station informing the other stations that it no longer is using the shared resource.

9. The method as claimed in claim 1, further comprising the step of one of the plurality of stations administrating the shared resource as being free if the one station does not receive an updated status message indicating that the shared resource is in use within a predetermined period following receipt of the last status message indicating that the shared resource was in use.

10. The method as claimed in claim 1, wherein the information distribution system comprises a plurality of shared resources, wherein:
the step of checking the resource status information comprises checking the resource status information relating to individual ones of the shared resources until a predetermined number of available shared resources has been located or until the status information for all shared resources has been checked; and
the step of selecting the available shared resource comprises randomly selecting one of the plurality of shared resources from the located available shared resources, if the checking results in locating more than one available shared resource.

11. The method as claimed in claim 1, further comprising the steps of:
the initiating station sending a request to at least one other station requesting the other station to indicate whether a specific shared resource is still in use if the checking indicates that the specific shared resource is not free, and
receiving said request indicating to the initiating station whether the specific shared resource is still in use according to the resource status information of the receiving station.

12. The method as claimed in claim 1, further comprising:
the steps of the initiating station:
claiming the selected resource by informing other ones of the stations of the intended access to the selected resource,
waiting a claiming period, allowing other ones of the stations to return resource status information regarding the selected resource, and
only accessing the selected resource, if within the claiming period no status message is returned which conflicts with the claim of the initiating station.

13. The method as claimed in claim 12, further comprising the step of determining the claiming period randomly within a predetermined time window.

14. An information distribution system comprising a plurality of stations and at least one shared resource; each station comprising:
a memory for storing resource status information;
communication means for transmitting a status message comprising status information relating to the shared resource;
access means for gaining access to a shared resource; and
a controller for causing the access means to access a selected shared resource, the communication means includes means for receiving a transmitted status message;
wherein the controller is arranged to:
update the stored resource status information according to a received status message; and
if one of the plurality of stations requires the shared resource:
check the resource status information stored in the memory of the one station to determine whether the shared resource is available, and
if the checking indicates that the shared resource is available:
select the available shared resource, and
cause the communication means to send the status message informing the other stations that the one station is using or intends to use the selected resource.

15. The information distribution system as claimed in claim 14, the controller of the one station is arranged to recurrently cause the communication means to send the status message informing the other stations that the one station is using the shared resource.

16. The information distribution system as claimed in claim 14, wherein the communication means is arranged to broadcast the status message.

17. The information distribution system as claimed in claim 14, wherein the status message comprises priority information indicative of the usage of the shared resource by the station sending the status message and the resource status information comprises the priority information.

18. The information distribution system as claimed in claim 16, wherein the system comprises a plurality of shared resources, wherein the controller is arranged to indicate that one of the plurality of shared resources is available if the shared resource is free or if the shared resource is used at a priority submissive to an intended new usage and no other shared resource is free.

19. The information distribution system as claimed in claim 18, wherein the controller is arranged to, in response to receiving the status message, cause the access means to cease accessing the shared resource if the station uses the shared resource and the usage is of a submissive priority compared to the priority indicated in the received status message.

20. The information distribution system as claimed in claim 19, the controller is arranged to, in response to receiving a new status message, cause the access means to cease accessing the shared resource if the new status message is received within a predetermined period after first sending the status message for the shared resource and if the usage of the shared resource is of an equal priority compared to the priority indicated in the received new status message.

21. The information distribution system as claimed in claim 14, wherein the controller is arranged to cause the communication means to transmit the status message indicating that the shared resource is no longer in use when the shared resource is released.

22. The information distribution system as claimed in claim 14, the controller is arranged to update the stored resource status information to indicate that the shared resource is free if no status message indicating that the shared resource is in use is received within a predetermined period following receipt of the last status message indicating that the shared resource was in use.

23. The information distribution system as claimed in claim 14, wherein the system comprises a plurality of shared resources, wherein:

checking the resource status information comprises checking the resource status information relating to individual ones of the shared resources until a predetermined number of available shared resource has been located or until the resource status information for all shared resource has been checked; and selecting the available shared resource comprises rand only selecting one of the plurality of shared resources from the located available shared resources, if the checking results in locating more than one available shared resource.

24. A data processing station capable of accessing at least one shared resource, the station comprising:

a memory capable of storing resource status information;

a communication module arranged to transmit or receive a status message relating to the shared resource;

an interface capable of accessing the shared resource; and a controller coupled to the memory, the communication module and the interface, the controller being arranged to check the resource status information stored in the memory to determine whether the shared resource is available, if available, to select the available shared resource, and to cause the communication module to send the status message indicating that the available shared resource is being used or is about to be used.

* * * * *